Figure 1:
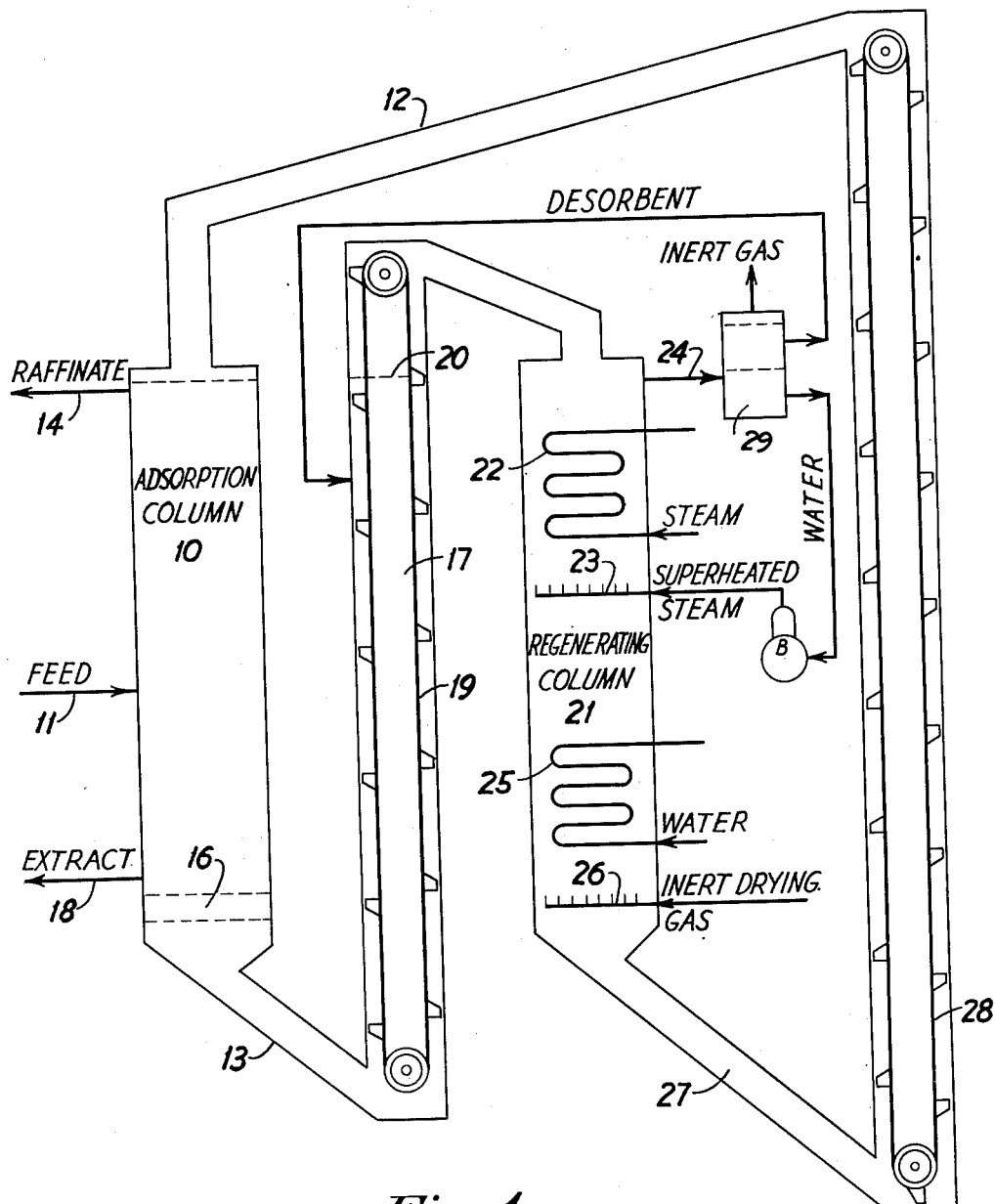

INVENTORS
W.H. Claussen
W.H. Shiffler

By: _____
ATTORNEYS

Patented May 17, 1949

2,470,339

UNITED STATES PATENT OFFICE 2,470,339

CONTINUOUS ADSORPTION PROCESS

William H. Claussen, Berkeley, and William H. Shiffler, San Francisco, Calif., assignors to California Research Corporation, San Francisco, Calif., a corporation of Delaware Application July 30, 1945, Serial No. 607,730

15 Claims. (Cl. 196—147)

This invention relates to a continuous adsorption process for the fractionation of fluid compositions and particularly to a continuous adsorption process for the fractionation of liquid organic compounds.

The basic steps involved ni the physical process of adsorption have been the subject of intensive study for the past twenty years. Many laboratory methods have been developed for the analysis and separation of hydrocarbon fluids by means of adsorption. Some commercial use has been made of adsorption, for instance in the clarification of lube oils.

Prior to the present invention, however, all known small scale laboratory analytical processes and commercial scale processes have been batch operations. Analytical laboratory processes are quite satisfactory on a batch basis. In large scale operations, on the other hand, batch adsorption processes are not economically attractive except for treating specialty stocks by very simple operations and especially using cheap, expendable adsorbents.

Many attempts have been made to make these simple processes at least semi-continuous. Numerous patents have been issued and many articles have been written on various methods of regenerating the spent adsorbent. It has been suggested, for example, that the adsorbent be regenerated by washing with an aqueous soap solution, a dilute acid solution, a pine oil mixture, dihydric alcohols, just plain water and many other mixtures. It has been also suggested that the adsorbent be regenerated by burning off the extract, or most commonly, that it be thrown away when exhausted and a new batch used. Some of these regenerating schemes have been successfully applied on a batch operation basis. Some processes have been developed, particularly for the treatment of specialty stocks. Up to this time, however, these regeneration processes have not been successfully applied to a continuous adsorption process for treating common, inexpensive liquid organic compounds such as petroleum stocks.

Each of the heretofore proposed regeneration processes has its own serious faults. Regeneration of the adsorbent by burning or by subjecting to very high temperatures, the most common systems heretofore used, are disadvantageous. Regeneration by burning obviously destroys the selectively adsorbed material on the adsorbent. This practice is wasteful at best, and in most cases, particularly when separation rather than purification is the desired operation, regeneration by burning is economically impossible. This is also generally true of regeneration at high temperatures. The products desorbed are very likely to be destroyed by the excessive heat and very little recovery is accomplished. On the other hand, very high temperatures previously used produced either by burning or indirect heat are detrimental to the adsorptivity of the adsorbent treated. Active carbon, a superior adsorbent, is not usable in these regeneration schemes since it is destroyed by direct burning, or in some cases even by high temperature regeneration.

Such complex processes of adsorbent regeneration as washing with pine oil, aqueous soap solution, etc., are generally not used since the problems involved in desorbing these desorbents are more complex than the original regeneration problem. Aqueous desorbents in general have proved unsatisfactory for desorbing organic products due to the low mutual solubility and hence slow rate of desorption.

Ethers, ketones and alcohols have been used as desorbents in laboratory batch operations and even in some multiple unit batch operations. Up until the present time so far as known, however, all attempts at continuous operation for the fractionation of organic liquids using these or similar desorbents have been unsuccessful.

In general, a continuous process offers many advantages over a batch process. In a batch process, the plant must stop while regeneration takes place or it is necessary to have a number of units some being on stream while others are in regeneration. Man hours required per volume of charge, equipment necessary, time consumed per volume of charge and, consequently, unit costs, are in general considerably greater in batch processes than in a continuous process.

It is therefore an object of this invention to provide a continuous adsorption process for the fractionation of liquid organic compounds.

It is another object of this invention to provide a continuous adsorption process for the fractionation of liquid petroleum stocks.

It is a further object of this invention to provide a continuous adsorption process in which the selectively adsorbed material or extract may be recovered in substantial yields.

It is still another object of this invention to provide a continuous adsorption process in which the regeneration of the adsorbent is accomplished at moderate temperatures.

It is another object of this invention to provide a continuous process in which the regeneration of the adsorbent is accomplished with little or no detrimental effect on its adsorbent power.

It is another object of this invention to provide a continuous adsorption process in which activated carbon may be used as the adsorbent.

It is a further object of this invention to provide a continuous adsorption method capable of being applied economically to the fractionation of ordinary inexpensive petroleum stocks.

It is another object of this invention to provide a continuous process for the adsorption fractionation of Diesel fuels.

It is still another object of this invention to provide a continuous process for the adsorption fractionation of kerosene.

In accordance with these and other objects which will be obvious from the disclosure, this invention consists in a method of fractionating liquid organic compounds in an adsorption fractionation system comprising a circulating adsorbent body with a liquid phase adsorption zone and a regeneration zone therein, which comprises passing said organic compounds into said adsorption zone under coordinated adsorbing conditions, separating a raffinate fraction and an extract fraction, removing said raffinate fraction from said adsorption zone, removing said extract fraction, regenerating spent adsorbent in said regeneration zone, and recirculating said regenerated adsorbent to said adsorption zone.

Figure 2:
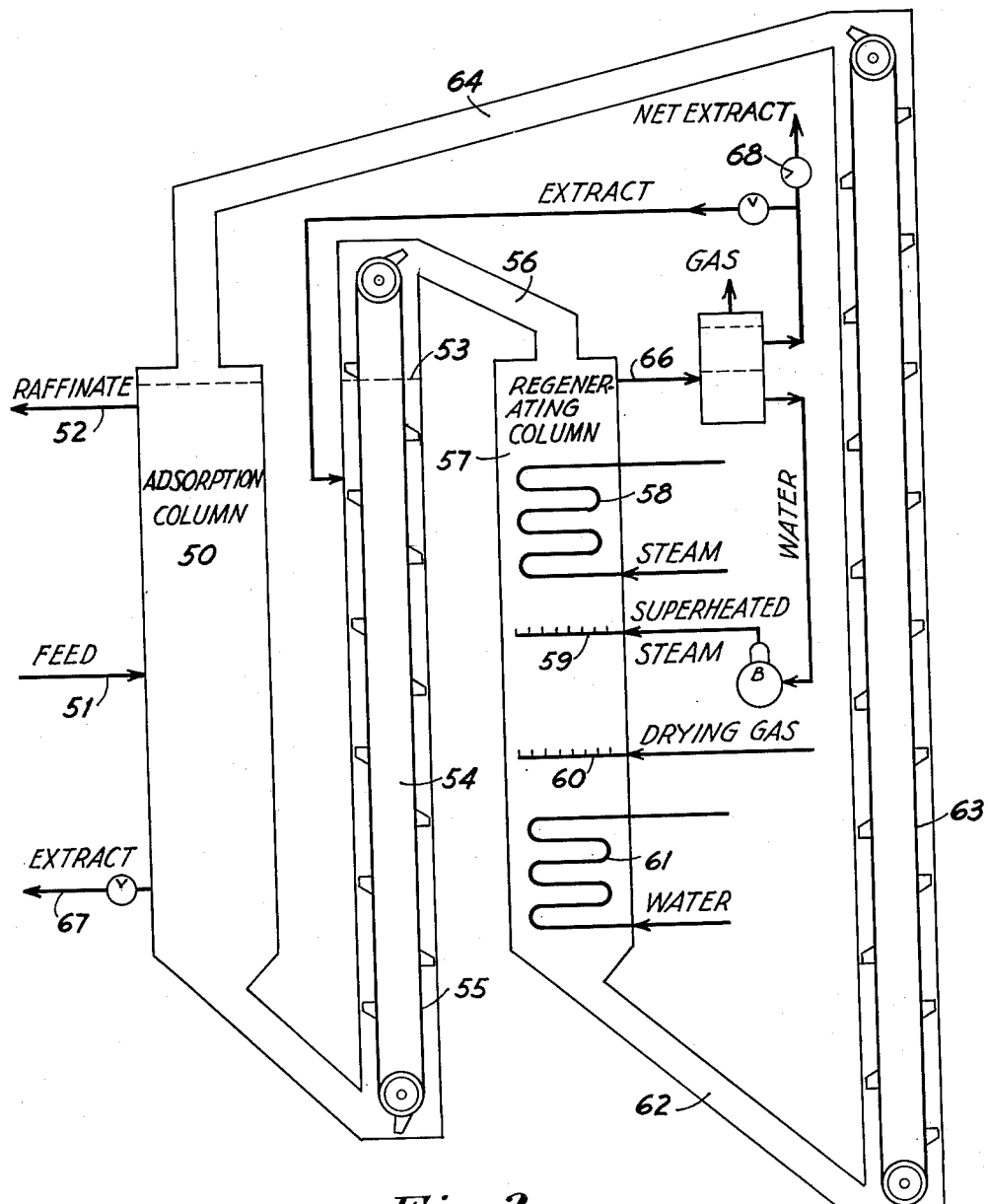
Figure 3:
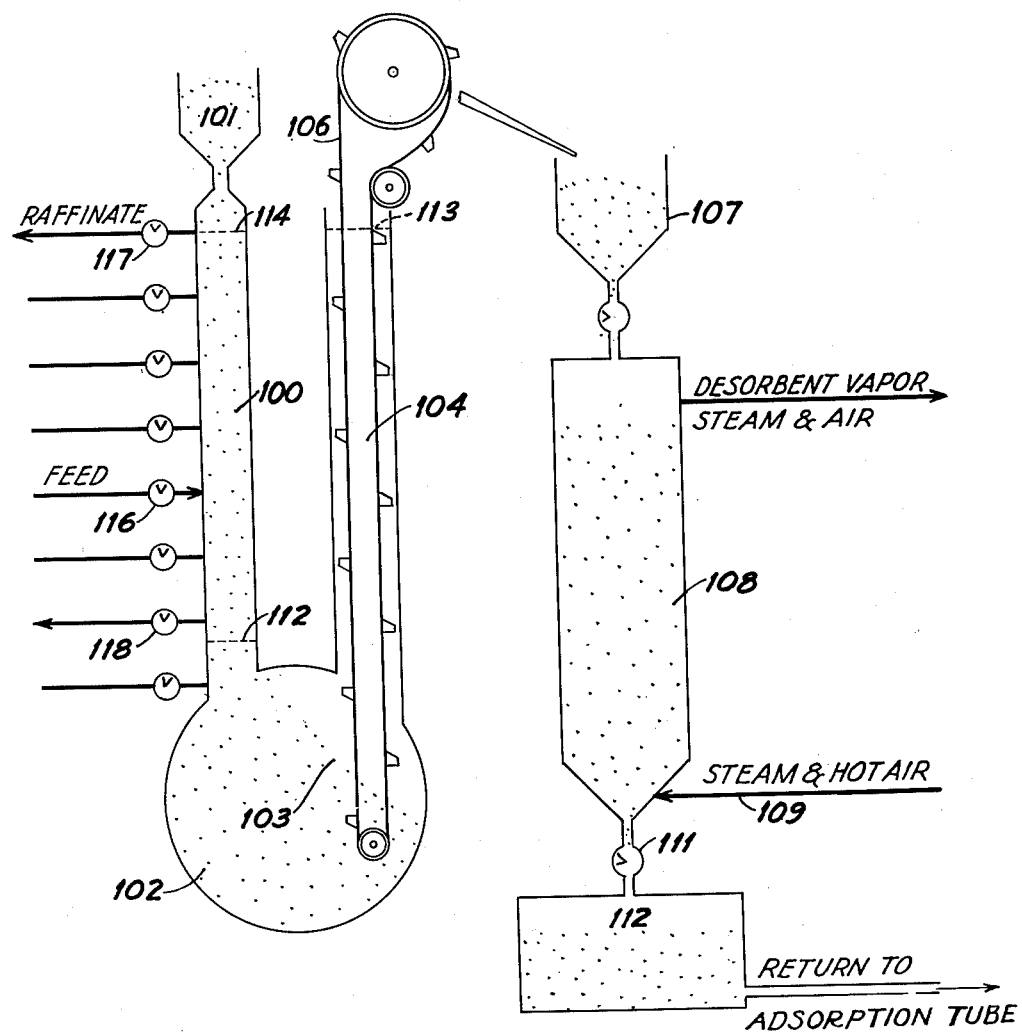

This invention will be more specifically described with reference to the accompanying drawings: Figure 1 is a schematic diagram in elevation of one variation of means adapted to practice the process of this invention, in which the extract is displaced by a fluid desorbent which desorbent is then stripped from the adsorbent. Figure 2 is a schematic diagram in elevation of another variation of means for carrying out this process wherein the extract is stripped directly from the adsorbent. Figure 3 represents, in elevation, a unit adaptable for studying the variables of adsorption fractionation.

Referring to Figure 1, a liquid organic compound is fed to adsorption column 10 via line 11. The particular section in the column chosen to introduce the feed will vary with the feed stock, character and degree of separation desired, adsorbent used, rate of adsorbent circulation, temperature and pressure at which fractionation is to take place as specifically described hereinbelow. The circulating body of adsorbent comprised of solid adsorbent particles aggregated in a columnar mass passes from tube 12 downward through column 10 to tube 13. The feed is in effect passed up column 10 countercurrent to the adsorbent. As the feed passes up the column, the desired fractionation is accomplished by selective adsorption of one of the fractions. The adsorbed fraction (hereinafter in a synonymous sense in certain instances called the extract) is carried down the column by the adsorbent while the non-adsorbed fraction (hereinafter in a synonymous sense in certain instances called the raffinate) passes up the column and out the top via line 14. The completeness of fractionation of extract from raffinate will depend on relative rates of adsorbent and feed, the adsorbent chosen and other variables as described in detail below. The adsorbent, containing extract, passes by controlled gravity flow down column 10 to desorbent section 16 which is maintained by a static column or head of desorbent in desorbent leg 17 the upper level of which is indicated by numeral 20; this desorbent liquid is in free fluid intercommunication with the base of the adsorption column, the interface of the desorbing liquid and the feed being well within the adsorption column as shown at 16. As the adsorbent progresses down through the desorbent, the extract is displaced from the adsorbent by the desorbent. This displaced extract collects just above desorbent section 16 due to its lower density, and is withdrawn via line 18. The adsorbent, containing desorbent, is then lifted by elevator 19 through desorbent leg 17 and is carried to the top of regenerating column 21. Here the adsorbent is heated by steam coil 22 to prevent condensation of stripping vapor and then passes down column 21 to superheated steam injector 23. This superheated steam serves to strip the desorbent from the heated adsorbent and carry the stripped desorbent vapor and steam out the top of column 21, via line 24. The stripped adsorbent passes down the column past closed coil water cooler 25 and inert gas drier 26. The cool, dried, regenerated adsorbent now passes down tube 27 to elevator 28 and is thence conveyed via tube 12 to the top of adsorber 10.

The steam-desorbent vapor mixture removed via line 24 is condensed (by means not shown) and separated in settling tank 29. The water may be converted to steam for reuse and the desorbent recirculated to desorbent leg 17 to replace desorbent removed with the adsorbent, thus maintaining a constant desorbent level 20 in desorbent leg 17.

Figure 2 shows a second modification of a continuous adsorption system. In this operation, feed enters adsorption column 50 via line 51, raffinate goes out the top of the column via line 52 and extract is carried down with the adsorbent and is concentrated in the bottom of column 50. In this case, however, no liquid desorbent is used to fill communicating column 54, instead of this embodiment of the invention column 54 is filled with the previously separated selectively adsorbed fraction of the feed. Extract-saturated adsorbent is conveyed by elevator 55 and tube 56 to the top of regenerating column 57. The adsorbent is heated by steam coils 58, stripped of extract with superheated steam at 59, dried with drying gas at 60 and cooled by cooling coil 61. The cold, dry, regenerated adsorbent is conveyed via tube 62, elevator 63, and tube 64 to the top of adsorption column 50 as in Figure 1.

The steam-extract vapor mixture from line 66 is condensed (by means not shown) and condensate separated, the water converted into steam and recycled. Extract is recycled to extract leg 54 to maintain extract level 53 constant. Net extract may be removed either from the bottom of adsorption column 50 via line 67 or from the separator via line 68.

In order that this invention may be more fully understood, a more complete discussion of the variables of the process will be given.

When certain solids are contacted with liquids, a portion of the liquid is firmly held or adsorbed to the surface of said solid. This phenomenon of adsorption is believed to be due to forces in the solid which are not satisfied at the solid surface and which extend out into the liquid phase. Two general types of adsorption are recognized, namely, physical or Van der Waal's adsorption and chemisorption or activated adsorption. Chemisorption is usually a relatively slow chemical surface reaction of the adsorbent and the substance adsorbed. Physical adsorption, on the other hand, takes place practically instantaneously and ordinarily no chemical reaction is involved. It is with the latter case, namely, physical adsorption, that this invention concerns itself.

Nearly all solids show some adsorptive power but this power is not of sufficient magnitude to be useful unless the adsorbent has a very large area per unit volume. This large area per unit volume may be due to extremely fine particle size or preferably to a porous structure. Surface area, however, is only one of the factors contributing to adsorption phenomena. Other important factors are pore size, particularly when pore size approximates molecular size, ionic lattice and Van der Waal's forces. Examples of suitable adsorbents are activated carbon, silica gel, alumina, magnesia, and the like.

Adsorbents are useful for separating two or multi-component mixtures due to the fact that adsorbent surfaces attract some compounds more strongly than others. Although some variation exists in the order of adsorption, in general adsorbents have been found to most strongly absorb compounds with molecular structures having a high dipole moment or high electrical polarizability. This degree of adsorption is influenced by the molecular structure of the different compounds; for example, the following classes of hydrocarbons are adsorbed in the order shown in Table 1.

Table 1

Paraffins
Naphthenes
Olefins
Cyclic olefins
Aromatics

Table 1 is arranged in order of replaceability, that is, any member in the series will be replaced by a member falling lower in the series. The farther apart any two members fall in Table 1, the greater the ease of fractionation by adsorption. In other words, paraffins and aromatics are readily separated by a relatively short column and with low contact times. Paraffins and naphthenes, on the other hand, are more difficult to separate by adsorption fractionation and require a longer column with somewhat longer contact times. Successful adsorption fractionation, it has been discovered, is not only dependent on the series given in Table 1, but is, in fact, dependent on a very exact coordination of variables in accordance with the disclosure of this invention. These variables will be discussed at length below but are mentioned here to avoid the impression that the desorption series as given in Table 1 is all that is necessary to carry out successful adsorption separations or fractionations among the designated classes of hydrocarbons.

Many adsorbents have been studied for the fractionation of organic compounds. A general theory has been formulated to aid in selecting a suitable adsorbent for a given fractionation and a specific confirmatory test has been devised to facilitate adsorbent selection.

In order to illustrate the theoretical aspects of this invention, a simple 2-component system will be considered, composed of components A and B, wherein component B is the more strongly adsorbed. The first consideration in adapting the process of the invention to a specific set of necessities, with a given adsorbent, is the volume of B (in cc. per gram of adsorbent) adsorbed from various concentrations of component B in an AB mixture. This relation of volume of B adsorbed to concentration of B is called the adsorption isotherm. The volume of B adsorbed is determined experimentally by adding a measured volume of a known composition of an AB mixture to a weighed sample of adsorbent under conditions of temperature and pressure similar to plant operating conditions. The liquid is sampled after equilibrium has been established and the amount of B adsorbed is calculated by analyzing the amount remaining in the liquid. The adsorption isotherm for the AB mixture may then be drawn by plotting a number of these points experimentally found at different concentrations of B.

In an AB mixture containing a known concentration of B to be fractionated or separated into its components A and B, the adsorption isotherm is used to give an indication of weight of adsorbent necessary to substantially completely remove all of the component B or, in a continuous system, to determine the relative rates of flow of adsorbent and feed. Other features, however, affect the determination of relative rates in a continuous system. For example, the actual process of adsorption fractionation is found to take place over a finite distance of adsorbent column instead of instantaneously as theoretically postulated. This leads to areas of gradually varying composition, A (raffinate) becoming more concentrated toward the top of the column, B (extract) becoming more concentrated toward the bottom of the column. These areas of varying composition, hereinafter referred to as blurs, are caused principally by such factors as slow diffusion into the adsorbent from the body of the liquid and uneven liquid flow, and it has been found that these blurs may be calculated with the use of known physical principles. The operating lines and transfer coefficients have been found to be subject to calculation in a manner similar to standard fractional distillation practice. The above outlined factors may, on being combined in the manner disclosed for the practice of this invention, give operating characteristics of any given desired adsorption fractionation.

Similar methods are applied to the desorbing of adsorbed components and to the high temperature stripping of either extract or desorbent to give operating characteristics for these steps.

In general, from the above theoretical considerations, a suitable feed is one composed of at least two fractions which have different adsorption characteristics with respect to a given adsorbent. A simple case in point is a substantially paraffinic stock with some aromatics present. The paraffins will not be as strongly adsorbed as the aromatics and will pass up the column and be removed as raffinate. The aromatics, on the other hand, will be more strongly adsorbed and carried down the column and removed as extract. The length of column necessary for given rates of adsorbent and feed can be readily calculated as indicated herein. It is possible to separate three or more component systems by a modification of this process. However, if more than two fractions are to be separated, it is usually desirable to refractionate by adsorption either the raffinate or the extract fractions.

It has been found that the compounds normally occurring in petroleum fractions and that compounds useful as desorbents fall in a series with regard to their replaceability from adsorbents such as, for example, silica gel. Table 1 shows the order of replaceability of a few hydrocarbon types. This table, however, is only a rough indication of the relative adsorption of any given compound. Many other factors besides position in Table 1 have an important effect on adsorption as pointed out in the theoretical discussion above. Table 2 shows a specific adsorption series as determined by theoretical and experimental data.

Table 2

| | |
|---|---|
| Iso-octane | Dioxane |
| Hexene | Cellosolve acetate |
| Cyclohexene | Furfural |
| Benzene | Methyl ethyl ketone |
| Toluene | Ethyl alcohol |
| Dibutyl ether | Morpholine |
| Cyclohexanol | Water |

Several specific examples of petroleum stocks that may be fractionated by adsorption will be helpful. Kerosene distillate may be dearomatized and desulfurized to produce a superior grade stock. Gasoline may be desulfurized and also partially deparaffinized to produce a higher octane fuel. Diesel fuel may be dearomatized to produce a high cetane number product. Lube oils may be dearomatized and deasphaltized to give a high quality oil. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce a relatively pure compound or it may be used merely to further concentrate the desired compound in its original mixture. Many other adsorption fractionations will be obvious to those skilled in the art.

The feed which is to be fractionated by adsorption (and which meets the theoretical and laboratory tests for a fractionatable mixture as set forth above) is fed to the adsorption column at a point calculated as indicated to give the desired separation under any given operating conditions of relative flow rates of adsorbent and feed, length of column, temperature and pressure. A raffinate fraction of the desired purity is then removed from the top of the column and an extract fraction is carried by the adsorbent to the bottom of the column.

Two general methods are shown in Figures 1 and 2 for the removal of extract from the adsorbent. In Figure 1 the extract is removed by a liquid desorbent which is in turn removed by a hot vapor, such as steam, at point 23. This type of operation is used when the extract cannot be directly stripped from the adsorbent, as, for example, when it is decomposed, polymerized or otherwise deleteriously affected by hot stripping vapors.

A suitable liquid desorbent for a process similar to that shown in Figure 1 is a liquid which will desorb substantially all the extract from the adsorbent at a sufficiently rapid rate so that the desorption section of column 10 is not excessively long, has a gravity not substantially lower than and preferably equal to or in excess of the gravity of the extract to be desorbed and has sufficient solubility in the extract to allow diffusion through the selectively adsorbed fraction of the feed to the surface of the solid adsorbent. In addition to these properties, a suitable desorbent must be removable from the adsorbent by some type of heat stripping as described below.

In most cases, one test, in conjunction with physical property data, has been found sufficient to determine whether or not a given liquid will be a good desorbent under any particular set of conditions.

Firstly, a suitable desorbent should not possess a specific gravity substantially less than the extract to be desorbed and preferably should have a gravity at least equal to the extract, since if its gravity is appreciably less than that of the extract, said desorbent will tend to rise upward through the desorbent level in zone 16 in column 10. Slow rates of flow and large size adsorbent particles accentuate this tendency, and desorbent will, under extreme conditions, travel up the column to such a degree that it will contaminate the raffinate system.

Secondly, the desorbent and extract to be desorbed should preferably be mutually miscible in order that the desorbent may rapidly penetrate to the surface of the adsorbent and readily displace the extract therefrom. Mutual miscibility is not essential to the displacement, however, and a reasonable solubility of desorbent in extract is often sufficient.

Thirdly, a suitable desorbent should desorb the extract rapidly enough to be of practical use in the plant. Tables 1 and 2 are useful in selecting a suitable desorbent that will function at a sufficiently rapid rate. Any given compound will be desorbed by a compound falling below it in Table 1 or 2. The farther separated the two compounds are in the series, other things being equal, the more rapid the desorption becomes. As a specific example, if toluene is the extract to be desorbed, dioxane will successfully desorb the toluene in a reasonably short section of the column. Morpholine, on the other hand, will desorb the toluene in about half this length of column. In general, the length of column required for a specific extract to be desorbed by a given desorbent, or in other words the rate of desorption, may be determined by a process similar to that described for choosing a suitable adsorbent.

A simple batch test may be made in which the desorbent to be tested is passed through a stationary column of adsorbent saturated with the extract to be desorbed. The rate of flow of the desorbent should be regulated to approximate the proposed rate of adsorbent in the plant. The length of the blur may be measured by sampling at several points along the column. The length of the blur in this case will correspond to the length of the desorption section necessary to successfully desorb the given extract with the chosen desorbent. A continuous test more nearly approximating plant operating conditions may be made if desired. In this case, adsorbent saturated with extract is passed down a column and through a stationary desorbent section. Samples are taken and the length of the blur found. This blur will correspond very closely to the length of desorption zone necessary in plant operations with the test desorbent. These tests may be repeated if necessary until a desorbent is found which will operate within the available length of desorbent zone.

In addition, it will be found desirable to choose as desorbent a material that may be sufficiently easily handled, is readily separable from the adsorbent in the succeeding step, is reasonable in price and readily available.

After the adsorbent has been saturated with the selectively adsorbed fraction of the feed (in Figure 2) or saturated and desorbed (Figure 1) the wet adsorbent passes to the bottom of the adsorbing column where it is picked up by a bucket elevator as shown in the drawings, or it may be carried by any standard type mechanical elevator or in specially designed apparatus it may be blown or jetted or otherwise conveyed to the top of the regenerating column. In the case of Figure 1, the adsorbent is now saturated with desorbent and in the case of Figure 2, the adsorbent is saturated with extract.

It has been found highly advantageous, and it is a particular feature of the invention, to preheat the adsorbent before subjecting it to vapor stripping. This pretreatment has two principal objects. Preheating accomplishes a gradual temperature increase rather than a sudden increase. It has been found that sudden thermal shock tends to disintegrate the absorbent. This shock treatment is particularly disadvantageous when medium and large size adsorbent particles are used. Shock disintegration produces many small-size particles which completely alter the initial or normal and continuous plant operation. The second objective of preheating is to prevent the condensation of liquids on the incoming adsorbent. This is particularly desirable when the stripping vapor is steam or any material more strongly adsorbed than the raffinate since any water or strongly adsorbed substances on the adsorbent are very deleterious to its efficiency in this process.

The preheating may be accomplished by steam coils as shown or by any standard heating arrangement such as electric strip heaters, hot gas tubes, etc. This heating arrangement is preferably adjusted to heat the adsorbent to a temperature about midway between the inlet temperature and the stripping vapor temperature. For example, when the adsorbent enters the column at room temperature and superheated steam at 600° F. is used as a stripping vapor, the heater should be adjusted to heat the adsorbent to a temperature of about 300° to 400° F. The preheating section may be only at the top of the column as shown in the figures or it may extend part-way or even all the way down to the stripping vapor inlet. It is sometimes advantageous to utilize two heating zones, one being at the top of the column and the other being near or at the stripping zone. Preheating is less advantageous in the practice of the process in the event that a sufficiently mechanically rugged, thermally stable adsorbent or small-size adsorbent is used with a stripping vapor that will not condense at room temperature.

The cooling coils shown at 25 in Figure 1 serve a similar purpose, that is, to gradually cool the hot adsorbent back to room temperature for recirculation. A sudden cooling would be too great a thermal shock for most moderate sized adsorbent particles and it is highly desirable to gradually cool the hot adsorbent. Alternatively, shock cooling may be prevented if the column is made sufficiently long, thus permitting the adsorbent to cool itself slowly enough by allowing heat to radiate from the cooling section.

The hot vapor stripping operation is based on the theory that elevating the temperature of the adsorbent markedly increases the escaping tendency of materials held by the adsorbent. Steam is shown as the stripping vapor in the figures because it has several distinct advantages in this operation. It is to be understood, however, that many vaporizable materials are suitable as stripping vapors, for example, benzene, acetone and the like. In general, a suitable stripping vapor is one that can be readily heated from about 400° F. to about 800° F. and one which will not condense above the practical operating temperature of the adsorbent at the stripping vapor exit. This temperature is normally of the order of about 200 to 250° F. It is also preferable to have a stripping vapor that can be readily separated from the removed liquid (desorbent in Figure 1, extract in Figure 2). Steam meets these requirements very well. Superheated steam readily attains desired operating temperatures, does not condense above 250° F. and is readily separable after condensation from many organic compounds encountered in this stage of the operation by simple stratification.

After the adsorbent has been stripped, it may then be treated with an inert gas to remove contaminating vapors. This gas treatment may be carried out either before cooling the adsorbent as in Figure 2 or after cooling as shown in Figure 1. The temperature of the inert gas is preferably adjusted to be in the same temperature range as the adsorbent treated so as to avoid the tendency of thermal shock. Inert gas treatment is particularly desirable in the event that the stripping vapor is more strongly held by the adsorbent than the non-selectively adsorbed fraction of the feed subsequently to be treated. On the other hand, the inert gas provides a convenient means of carrying the stripping vapor and stripped desorbent or extract to a separator. In some operations, it may be advantageous to eliminate the use of a steam stripper and employ only a hot inert gas stripper; in most processes however, the volume of gas required for complete stripping is so large as to make this treatment less desirable than vapor stripping.

The cooling section shown may be of any conventional design. Water cooling coils are shown but these may be replaced, for example, by refrigerating coils or by air cooling fins, depending on the amount of cooling required. If it is not necessary to heat the adsorbent to high temperatures, less careful attention need be directed to the cooling section, since the passage of the adsorbent to the adsorption tower will provide some cooling toward room temperature or that temperature at which the adsorbent desirably enters the adsorption column. In some cases it may be desirable to add a refrigeration section to the circulating adsorbent system and to refrigerate the adsorption column in order to more advantageously carry out a desired fractionation.

The variables in the adsorbent stripping are, preferably, adjusted to produce a regenerated adsorbent which has a high regenerated activity. In some cases, however, operation is possible with regenerated adsorbent having only 50% activity. This activity can best be determined by a test similar to the method outlined below, exemplified in connection with toluene-isooctane separation: add 1 g. of adsorbent per cc. of solution to a flask containing a measured volume (about 25 cc.) of 50–50 toluene-isooctane. Allow to stand two hours. Analyze a sample of the liquid for per cent toluene (such as by refractive index) and calculate the amount of toluene removed from solution by the regenerated adsorbent (i. e., the amount adsorbed). The activity of a new sample of the adsorbent is found by a similar process. The per cent activity is then given by the relation:

Per cent activity =

$$\frac{\text{toluene adsorbed by reactivated adsorbent}}{\text{toluene adsorbed by new adsorbent}} \times 100$$

In some operations it may be advantageous to subject a part of the adsorbent to more drastic regenerating conditions. If this step is advisable, it may be carried out by removing, for example, about 10% of the hot adsorbent (preferably from the 600° F. zone) and passing it through an auxiliary regenerating system (not indicated in the drawings) wherein temperatures as high as 800° F. may be used in some cases. An air stream may be used if this does not have a detrimental effect on the adsorbent. The hot adsorbent may be returned to the cooling system of the main regenerating column or it may be cooled and returned to the bottom of said column.

The regenerated adsorbent is returned to the top of the adsorption column for reuse. It is desirable to wet the regenerable adsorbent with raffinate prior to its introduction into the adsorption column 10 (Fig. 1), as it has been found that such wetting serves to aid in bringing the adsorbent to operating temperature, it makes for more readily controlled conditions at the top of the adsorbing tower, it degasifies the regenerated adsorbent and preserves it from contaminants in the surrounding atmosphere.

The particle size and physical shape of the adsorbent used, assuming a porous structure, is dependent mainly on the type of equipment it is to be used in. With the equipment shown a mesh size of between 30 and 200 has been found convenient. However, sizes as large as 5 mesh and as small as 325 mesh have been used. Granular particles are quite satisfactory in these operations as are pelleted or specially formed adsorbents. The adsorbent should be in such form that it will readily circulate in the given system.

The stripped vapors leaving the regenerating column are condensed, the gas is allowed to escape and the liquids separate into two layers. The water layer is recirculated to steam boilers and the desorbent layer is recirculated to the desorbent leg 17 (as in Figure 1), or part of the extract layer is recirculated to the extract leg 54 (as in Figure 2) and the remainder is removed as net extract via line 68. If the liquids are not separated by settling they may be separated by fractional distillation, solvent extraction, crystallization, or other convenient means.

The separation or fractionation of normally solid or gaseous organic compounds, as well as the employment of normally solid or gaseous organic compounds as desorbing agents, especially those readily liquefied, are within the scope of this invention since they may be changed to liquids by appropriate coordination of two normal process variables, namely, temperature and pressure. For example, this process is readily adaptable to the fractionation of a normally gaseous butene-butadiene liquid mixture by slightly increasing operating pressures. Similarly it is within the scope of this process to purify a normally solid naphthalene stock by conducting the liquid adsorption fractionation at a moderately elevated temperature.

Although a downwardly moving body of adsorbent material is shown and described, in some cases, such as when the density of the raffinate is substantially greater than the density of the extract, it may be advantageous to circulate the adsorbent body upwardly through adsorption zone, removing raffinate from the bottom of the column and extract from the top of the column. In other cases it may be advantageous to operate the continuous process described utilizing a horizontal adsorption zone.

Several specific examples of applications of this process are given below to further illustrate the invention. These examples should not be construed as limiting the invention to the precise details set forth.

*Example 1.*—A glass adsorption unit is shown in Figure 3. This unit was constructed for the purpose of intensively studying the operating characteristics of adsorption systems. The adsorption zone is made of glass in order to more readily observe operation, and was fabricated by sealing two vertical 8' x 47 mm. glass tubes to a 2 liter round flask. The adsorption tube 100 is equipped with valved outlets at 12" intervals and is filled with adsorptive silica gel from funnel 101. The silica gel attains its natural angle of repose in flask 102 as indicated by line 103 and can be removed through elevator tube 104 by means of a motor driven chain bucket elevator 106 inserted therein. The silica gel removed by this elevator is dropped into funnel 107 connected to regenerator column 108 which comprises a heated section of 8" pipe about 5' long. The gel is heated to above 250° F. and is stripped with superheated steam from inlet 109. Heat and steam stripping are adjusted so that a temperature of 600° F. is reached. Preheated air is used as a drying gas, also being introduced via inlet 109. The regenerated gel is removed from regenerating column 108 to tank 112. From there the gel is recycled (by a means not shown) to funnel 101 on top of adsorption column 100.

The column is started up by adding a desorbent, for example, one composed of 75% ethyl alcohol and 25% ethylene chlorohydrin or 25% chloroform to elevator tube 104 until desorbent level 112 is reached. Desorbent is then added to the top of the desorbent (elevator) tube and at the same time feed is added to the adsorbent tube in such a manner that desorbent level 112 remains constant. When both tubes are filled with liquid to the desired level (desorbent level 113 and raffinate level 114 respectively) the unit is ready to operate.

A straight run kerosene distillate boiling between 382° F. and 520° F. and having an aniline point of 135° F. is fed at or slightly below the center of adsorbent tube 100 via valved inlet 116 at 200 cc. per hour. Six to 40 mesh silica gel is fed to the top of said adsorbent tube and removed from the bottom of said tube at a rate of 200 cc. per hour. Desorbent (75% alcohol—25% chloroform) is added at a rate sufficient to replace that removed with the adsorbent so as to maintain a constant head in the desorbent tube. Raffinate having an aniline point of 152° F. is removed via valved outlet 117 at a rate of 165 cc. per hour and extract having an aniline point of 20° F. is removed via valved outlet 118 at a rate of 30 cc. per hour, both rates being averaged over a 10 hour run.

The gel is elevated through the desorbent tube and is regenerated by heat and steam in an air stream as described. The regenerated gel is returned to the top of the gel column.

*Example 2.*—The same unit described in Example 1 is used. A kerosene distillate having an aniline point of 135° F. is fed to the center of an adsorbent tube at a rate of 60 cc. per hour. Silica gel is fed at a rate of 60 cc. per hour. Raffinate having an aniline point of 165° F. is recovered at an average rate of 50 cc. per hour and extract with an aniline point of 0° F. is desorbed and collected at 9 cc. per hour. This lower rate of flow of gel and feed gives a nearly complete separation of aromatics from non-aromatics and the two examples show the different results attained by altering adsorption conditions.

*Example 3.*—15,900 barrels per day of kerosene having 8% aromatics and 0.19 per cent sulfur are fed to a commercial scale plant similar to that shown in Figure 2. The feed is introduced at a point near the center of the adsorption column at a volume ratio of gel to feed of approximately 0.75. Silica gel at a temperature of about 125° F. is passed down the 55 by 13.5 foot column at a rate of 75 tons per hour. Raffinate is removed from the top of the column at the rate of 14,770 barrels per day, having an aromatic content of 2.5 per cent and 0.01 per cent sulfur. Treated kerosene is recovered in 93% yield. Gel and extract are elevated by the extract leg and are dumped into the regenerating column. The gel is preheated to 400° F. by 42 rows of 2" coils carrying 700° F. Dowtherm vapor. The gel is stripped with 600° F. superheating steam with the aid of a second heating section. One-half pound of steam per pound of hydrocarbon stripped is used. The stripped vapors and steam are condensed and allowed to settle. The water is returned to the steam boilers, extract is recycled for make-up and net extract is withdrawn.

The 600° F. gel is cooled to 300° F. by 32 rows of water tubes, and the elevating and storing operations serve to further cool the gel to 125° F. This cooling may be aided by quenching the gel with raffinate if desirable. The cool gel is recirculated at the top of the adsorption column. 10% of the circulating gel is removed from the 600° F. section of the regenerating column and is regenerated at 760° F. with air blowing. The gel is cooled to 300° F. and returned to the system.

*Example 4.*—The same kerosene stock as used in Example 3 is fed at a rate of 7,950 barrels per day to an adsorption system as described in Example 3. The ratio of gel to feed in this case is maintained at approximately 1.50. 7,240 barrels per day of raffinate are collected having 0.1 per cent aromatics and 0.0003 per cent sulfur. 91% recovery of purified kerosene is obtained. Gel regeneration is carried out as before.

*Example 5.*—A straight run Kettleman Hills Diesel fuel cut having a specific gravity of about 39.3° A. P. I. with a Diesel index of 53, and having a cetane number of 41 as determined by the gravity-boiling point relationship, is charged to the adsorption column of the apparatus described in Example 1. A rate of feed of 200 cc. per hour and a rate of flow of adsorbent of 37 cm. per hour are used. Raffinate, removed at a rate of 162 cc. per hour, has a Diesel index of 69 and a cetane number of 51.

*Example 6.*—A 50–50 mixture of isooctane and toluene is fed to the column described in Example 1 at a point 3 feet from the top of the column. The isooctane-toluene mixture is introduced at the rate of 203 cc. per hour and 6–40 mesh silica gel is fed at an average rate of 600 grams per hour. Raffinate is removed at the rate of 957 cc. per hour and has a composition of 98% isooctane. Extract, containing 95% toluene, is desorbed with ethyl alcohol and removed at the rate of 104 cc. per hour.

*Example 7.*—A feed composed of 50–50 isooctane-toluene is fed to the column of Example 1 at a point 6 feet from the top. This feed mixture is introduced at a rate of 605 cc. per hour, with silica gel being fed at an average rate of about 1400 grams per hour. Raffinate is removed from the top of the column at a rate of 231 cc. per hour and is composed of 98% isooctane. Extract is removed from the bottom of the column at a rate of 370 cc. per hour and contains 80% toluene.

*Example 8.*—A kerosene distillate having a gravity of 40.5° A. P. I. and an aniline point of 132° F. is fed to the column described in Example 1 at an average rate of 207 cc. per hour. 4 to 8 mesh activated alumina is fed into the column at a rate of 175 grams per hour. Desorbent, composed of 65% alcohol plus 35% ethylene chlorhydrin, is used. Raffinate having an aniline point of 142° F. and a gravity of 42.1° A. P. I. is removed at an average rate of 164 cc. per hour, and extract, with an aniline point of 94 and a gravity of 33.1° A. P. I. is removed at 42 cc. per hour.

While the character of this invention has been described in considerable detail and various illustrations have been given of a continuous adsorption process for a few specific separations, it is to be understood that the invention in its broader aspects is not limited thereto but includes numerous modifications and variations of continuous adsorption processes for the fractionation of liquid organic compounds within the scope of the appended claims:

We claim:

1. A process for continuously separating organic compounds capable of being selectively adsorbed by contact in the liquid phase with a solid adsorbent and wherein the specific gravity of the non-adsorbed fraction is less than that of the selectively adsorbed fraction, which comprises continually moving particles of a suitable solid adsorbent aggregated into a columnar mass or bed downwardly by gravity flow through an adsorption zone, continually feeding the organic compounds in the liquid phase at an intermediate point into the adsorption zone into contact with the moving mass of adsorbent, continually withdrawing a liquid non-adsorbed fraction from the upper portion of the adsorption zone, maintaining adjacent said adsorption zone a column of a desorbent liquid in free fluid inter-communication with the base of the adsorption zone, said column having a vertically extending portion of sufficient height to balance the column of liquid in the adsorption zone and a second portion extending upwardly to the base of said adsorption zone thereby constituting a desorption zone, withdrawing the solid adsorbent particles from the adsorption zone through said column whereby the selectively adsorbed fraction is desorbed by the liquid desorbent, withdrawing from the lower portion of the desorption zone the liquid fraction thus desorbed, separating the liquid desorbent from the solid adsorbent withdrawn from said column and continually adding to said column quantities of liquid desorbent corresponding to that withdrawn therefrom thereby maintaining the vertically extending portion at the required height.

2. A process for continuously separating organic compounds capable of being selectively adsorbed by contact in the liquid phase with a solid adsorbent and wherein the specific gravity of the non-adsorbed fraction is less than that of the selectively adsorbed fraction, which comprises continually moving particles of a suitable solid adsorbent aggregated into a columnar mass or bed downwardly by gravity flow through an adsorption zone, continually feeding the organic compounds in the liquid phase at an intermediate point into the adsorption zone into contact with the moving mass of adsorbent, continually withdrawing a liquid non-adsorbed fraction from the upper portion of the adsorption zone, maintaining adjacent said adsorption zone a column of the selectively adsorbed fraction in the liquid phase, said column having a vertically extending portion of sufficient height to balance the column of liquid in the adsorption zone and a second portion extending upwardly to and in free fluid inter-communication with the base of the adsorption zone, withdrawing the solid adsorbent particles from the adsorption zone through said column, separating the selectively adsorbed fraction from the solid adsorbent withdrawn from said column and continually returning separated selectively adsorbed fraction to said column thereby maintaining the vertically extending portion at the required height.

3. A process for continuously separating organic compounds capable of being selectively adsorbed by contact in the liquid phase with a solid adsorbent which comprises continually moving particles of a suitable solid adsorbent aggregated into a columnar mass or bed downwardly by gravity flow through an adsorption zone, continually feeding the organic compounds in the liquid phase at an intermediate point into the adsorption zone into contact with the moving mass of adsorbent, continually withdrawing a liquid non-adsorbed fraction from the upper portion of the adsorption zone, maintaining directly below said adsorption zone a body of desorbent liquid in fluid intercommunication with the base of the adsorption zone thereby constituting a desorption zone, withdrawing the solid adsorbent particles from the adsorption zone through said desorption zone whereby the selectively adsorbed fraction is desorbed by the liquid desorbent, and withdrawing the liquid fraction thus desorbed.

4. A process for continuously separating organic compounds capable of being selectively adsorbed by contact in the liquid phase with a solid adsorbent, which comprises continually moving particles of a suitable solid adsorbent aggregated into a columnar mass or bed downwardly by gravity flow through an adsorption zone, continually feeding the organic compounds in the liquid phase at an intermediate point into the adsorption zone into contact with the moving mass of adsorbent, continually withdrawing a liquid non-adsorbed fraction from the upper portion of the adsorption zone, maintaining adjacent said adsorption zone a column of a desorbent liquid, said column having a vertically extending portion of sufficient height to balance the column of liquid in the adsorption zone and a lower arm portion extending upwardly into free fluid intercommunication with the base of the adsorption zone thereby constituting a desorption zone, withdrawing the solid adsorbent particles from the adsorption zone through said column whereby the selectively adsorbed fraction is desorbed by the liquid desorbent, withdrawing the liquid fraction thus desorbed, separating the liquid desorbent from the solid adsorbent withdrawn from said column and continually adding to said column quantities of liquid desorbent corresponding to that withdrawn therefrom to maintain said column at the desired height.

5. A process for continuously separating organic compounds capable of being selectively adsorbed by contact in the liquid phase with a solid adsorbent, which comprises continually moving particles of a suitable solid adsorbent aggregated into a columnar mass or bed downwardly by gravity flow through an adsorption zone, continually feeding the organic compounds in the liquid phase at an intermediate point into the adsorption zone into contact with the moving mass of adsorbent, continually withdrawing a liquid non-adsorbed fraction from the upper portion of the adsorption zone, maintaining adjacent said adsorption zone a column of liquid, said column having a vertically extending portion of sufficient height to balance the column of liquid in the adsorption zone and a second portion extending upwardly to the base of the adsorption zone and in free fluid intercommunication therewith thereby serving to maintain the adsorption zone within confined limits, withdrawing the solid adsorbent particles from the adsorption zone through said column and continually returning liquid to said column to maintain it at the required height.

6. The process as defined in claim 4 wherein the organic compounds fed into contact with the moving mass of adsorbent comprise paraffinic and aromatic hydrocarbons.

7. The process as defined in claim 4 wherein the solid adsorbent is silica gel.

8. The process as defined in claim 5 wherein the organic compounds fed into contact with the solid adsorbent comprise paraffinic and aromatic hydrocarbons.

9. The process as defined in claim 5 wherein the solid adsorbent is silica gel.

10. A process for continuously separating petroleum stocks capable of being selectively adsorbed by contact in the liquid phase with a solid adsorbent, which comprises continually moving particles of a suitable solid adsorbent aggregated into a columnar mass or bed downwardly by gravity flow through an adsorption zone, continually feeding the petroleum stock in liquid phase at an intermediate point into the adsorption zone into contact with the moving mass of adsorbent, continually withdrawing a liquid non-adsorbed fraction from the upper portion of the adsorption zone, maintaining adjacent said adsorption zone a column of liquid comprising the selectively adsorbed fraction in liquid phase, said column having a vertically extending portion of sufficient height to balance the column of liquid in the adsorption zone and a second portion extending upwardly to and in free fluid intercommunication with the base of the adsorption zone, withdrawing the solid adsorbent particles from the adsorption zone through said column, separating the selectively adsorbed fraction from the solid adsorbent withdrawn from said column and continually returning a sufficient amount of the separated selectively adsorbed fraction to said column to maintain the vertically extending portion at the required height.

11. The process as defined in claim 10 wherein the liquid petroleum stock is a kerosene distillate.

12. The process as defined in claim 10 wherein the liquid petroleum stock is a kerosene distillate and the solid adsorbent is silica gel.

13. The process as defined in claim 10 wherein the liquid petroleum stock is a Diesel fuel stock and the adsorbent is silica gel.

14. The process as defined in claim 4 wherein the organic compounds fed into contact with the moving mass of adsorbent comprise a kerosene distillate.

15. The process as defined in claim 4 wherein the organic compounds fed into contact with the moving mass of adsorbent comprise a Diesel fuel stock.

WILLIAM H. CLAUSSEN.
WILLIAM H. SHIFFLER.

REFERENCES CITED

The following references are of record in the file of this patent:

UNITED STATES PATENTS

| Number | Name | Date |
|---|---|---|
| 1,412,954 | Mittasch et al. | Apr. 18, 1922 |
| 1,678,298 | Patrick et al. | July 24, 1928 |
| 2,306,610 | Barrer | Dec. 29, 1942 |
| 2,344,449 | Orgozaly | Mar. 14, 1944 |
| 2,376,425 | Frey | May 22, 1945 |
| 2,384,311 | Kearby | Sept. 4, 1945 |
| 2,395,491 | Mavity | Feb. 26, 1946 |
| 2,398,101 | Lipkin | Apr. 9, 1946 |

OTHER REFERENCES

Oil and Gas Journal, Sept. 1935, pages 29 to 32.

Gurwitsch et al: "The Scientific Principles of Petroleum Technology" (1932), Chapman and Hall, Ltd., London, pages 485, 488 and 499.